United States Patent [19]

Posner

[11] 3,810,433

[45] May 14, 1974

[54] PRINTED CIRCUIT CARD GUIDE

[75] Inventor: John David Posner, San Diego, Calif.

[73] Assignee: The National Cash Register Company, Dayton, Ohio

[22] Filed: Aug. 9, 1972

[21] Appl. No.: 278,893

[52] U.S. Cl. .......... 211/41, 317/101 DH, 339/17 M

[51] Int. Cl. .......... H02b 1/02

[58] Field of Search .......... 211/26, 41, 184; 339/17 LM, 17 M, 65, 66 M; 317/101 DH

[56] References Cited

UNITED STATES PATENTS

| | | | |
|---|---|---|---|
| 3,511,385 | 5/1970 | Ayling | 339/17 M X |
| 3,696,936 | 10/1972 | Straccia et al. | 211/41 |
| 3,723,823 | 3/1973 | Lit et al. | 211/41 X |
| 3,458,767 | 7/1969 | Hedger et al. | 339/17 M X |
| 3,184,069 | 5/1965 | Rosenberg | 339/17 LM X |
| 2,993,187 | 7/1961 | Bisbing et al. | 211/41 UX |
| 3,664,510 | 5/1972 | Kerschbaum | 211/41 |

FOREIGN PATENTS OR APPLICATIONS

| | | | |
|---|---|---|---|
| 64,493 | 11/1968 | Germany | 211/41 |

*Primary Examiner*—Roy D. Frazier
*Assistant Examiner*—Thomas J. Holko
*Attorney, Agent, or Firm*—J. T. Cavender; Lawrence P. Benjamin; James H. Phillips

[57] ABSTRACT

Guide-piece for sliding and aligning printed circuit boards into their proper positions when being plugged into a computer back panel, including in one embodiment a full-length slot for the circuit card, a trunnion for surrounding the back panel plug to ensure that the slot will guide the circuit card directly to the plug, and a self-attaching mechanism to allow the guide to be firmly affixed to the computer main frame.

2 Claims, 7 Drawing Figures

PRINTED CIRCUIT CARD GUIDE

BACKGROUND AND SUMMARY OF THE INVENTION

This invention relates to circuit cards for electronic computers and other electronic devices, and especially to card guides, which serve as interface structures for holding and aligning circuit cards mounted to the main structure of the computer.

Prior art card guides have usually been fixed to computer main frames by several bolts, which are time-consuming to mount and tighten and which leave the guide permanently affixed, more or less. Even worse, it is practically impossible to align the card slot in the guide exactly, relative to the end plug in which the card must fit snugly in order to achieve electrical connection.

It is, therefore, a general object of this invention to provide an improved printed circuit card guide for electronic equipment of all sorts. Further objects are to provide quick-mounting capability, easy removability, and near-perfect slot alignment.

In the achievement of the above and other objects and as a feature of this invention there is provided a one-piece printed circuit card guide having a full-length slot in which to slide the circuit card and having a trunnion at the inner- or plug-end, where the PC card plugs into the back panel connector commonly used in computer design. The trunnion grabs or embraces the connector in such a manner that the card guide inner end, and the full-length slot, are fixed with relation to the plug or connector which is a vast improvement over any prior card guide, no matter how close its mounting tolerances were maintained to try to come close enough to ideal design layout in the hopes that its slot and the plug or connector would then be well-aligned.

As another feature of this invention, the card guide is not mounted with exact-tolerance screws, bolts, or the like, but rather with easily manipulated integral fittings, such as the tangs shown in the preferred embodiment. A back-end or rear rectangular tab is mated with a close fitting slot in the frame of the computer to hold the card guide tightly in place to prevent excess vibration. Since the trunnion, discussed above, ensures proper alignment, mounting becomes a matter of ease of manufacture and labor-saving, with all tolerance problems eliminated. Other objects and features of this invention and a better understanding thereof may be had by referring to the detailed description of a preferred embodiment of Applicant's card guide as set forth below and the drawings which accompany this application.

DETAILED DESCRIPTION

Figure 1:
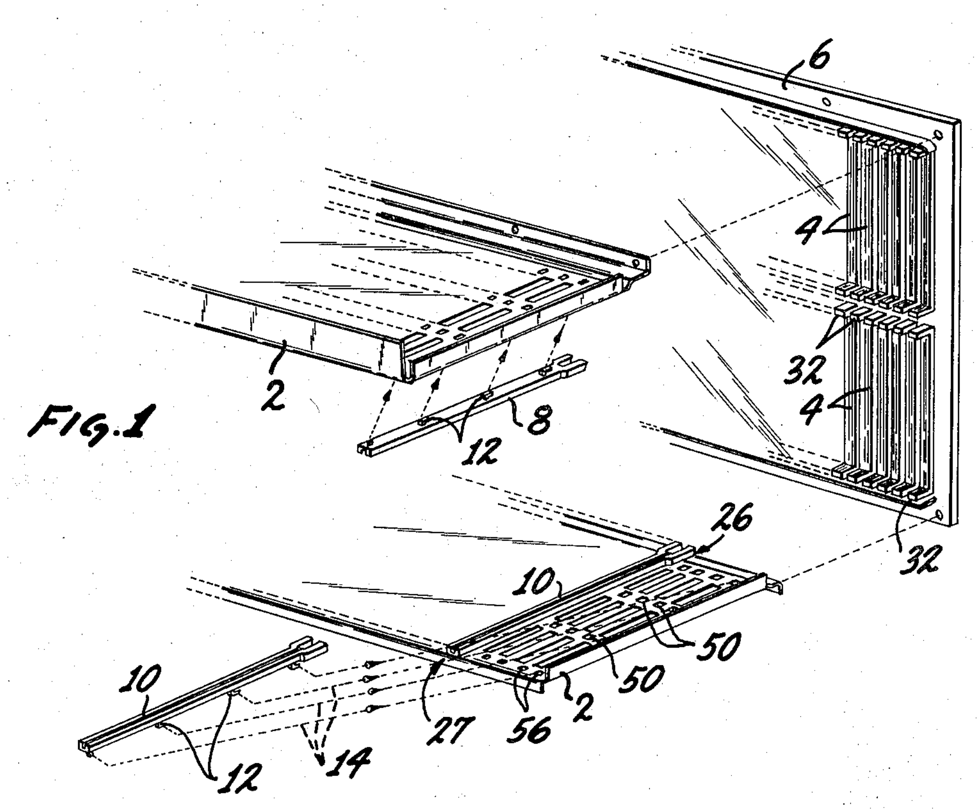
FIG. 1 is a perspective view partially exploded of the card guide disclosed herein as utilized in an electronic computer.

Referring to FIG. 1, the printed circuit guide of the instant invention is designed to be mounted upon the main structure 2 of an electronic computer or other device using circuit cards and has the purpose not only of holding circuit cards but of permitting circuit cards to be slid into electrical connection with connectors 4 mounted in the back panel 6 of a computer. According to the usual practice, there would be provided an upper card guide 8 and a lower card guide 10 between which a printed circuit card would be fitted. The card guides 8 and 10 in the prior art were bolted to the structure 2, but according to one feature of this invention, the card guides 8 and 10 are equipped with some form of self-fitting mounting device (here shown as the tangs 12) for mounting and removal. The dashed lines 14 show the motion whereby the card guide 10 can easily be implaced ready for insertion of a printed circuit card.

Figure 2:
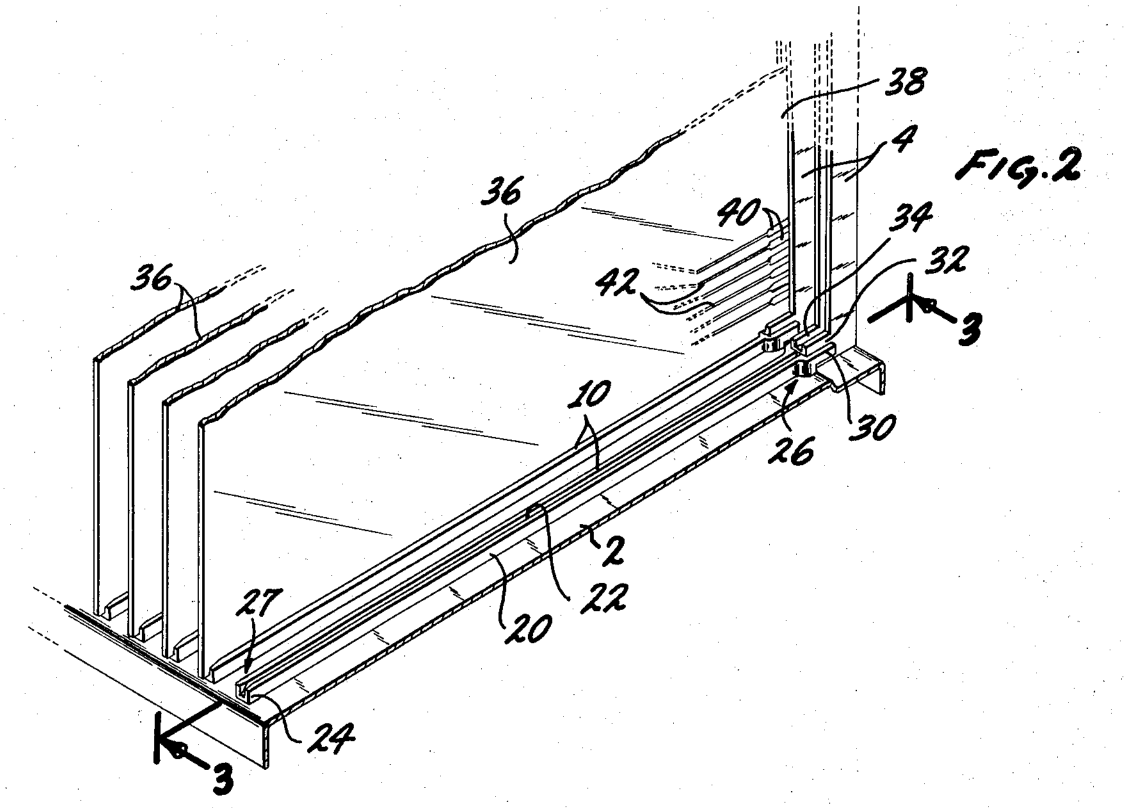
FIG. 2 is a perspective view of the card guide disclosed herein as mounted upon an electronic computer and with several printed circuit cards actually inserted in the guide

Referring to FIG. 2, the lower card guides 10 shown therein are composed of long strip base 20 having a slot 22 throughout its length. Any card guide 10 can be said to have an outer end 24 and an inner end 26, the former being the end which first receives a printed circuit card and the latter being the end nearest the connector 4. The outer end 24 would generally have a short entrance 27 wherein he slot is widened to facilitate insertion of a circuit card.

Accordig to the primary feature of this invention, the inner end 26 terminates in a trunnion 30 which grasps a trunnion receptacle 32 which is part of the connector 4. The trunnion receptacle 32 has a slot 34 which aligns with the slot 22 when the trunnion is in place.

Thus, according to this invention, when a printed circuit card 36 is to be inserted in electrical connections with the connectors 4 of a computer back panel 6, the inner edge 38 of the circuit card 26 is inserted at 26 and follows the slot 22 of the card guides 8 and 10 until it is fully plugged into the connector 4. The inner edge 38 of a printed circuit card 36 has deposited upon it a number of conductive strips 40 which, when the card 36 is fully inserted and properly aligned, are contacted by conductive elements (not shown) associated with the connector 4.

Electrical signals coming to and from the circuit card 34 are distributed through the card by leads 42 connected to the conductive strips 40. Thus, the printed circuit card guides 8 and 10 serve to facilitate the quick insertion of circuit cards in proper electrical connection with the connector 4. The feature of the trunnion 30 eliminates the former problem of having to forcefully "jockey" circuit cards in order to achieve admittance of the inner edge 38 and conductive strips 40 into the slot 34 of the connector 4.

Figure 3:
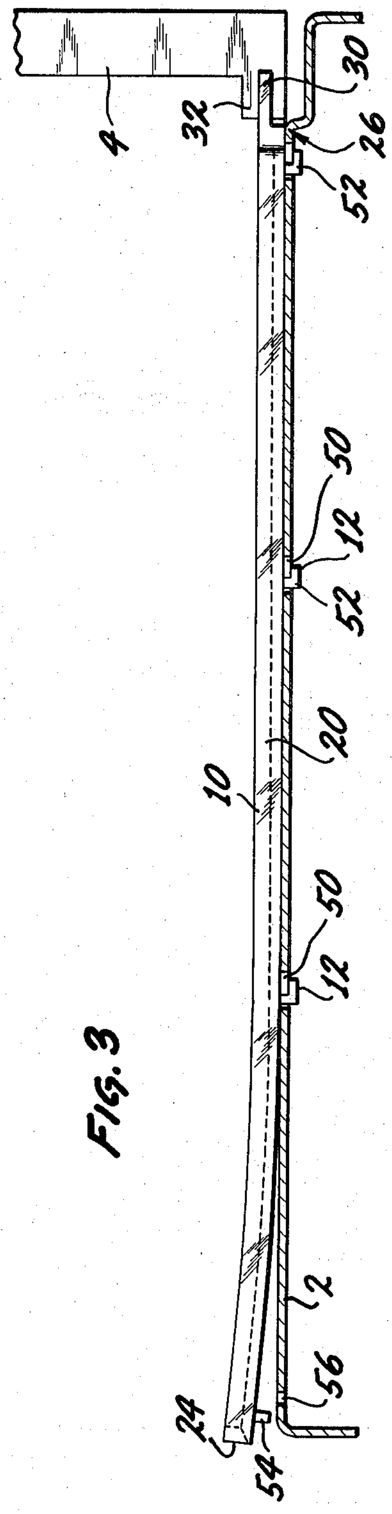
FIG. 3 is a side elevation of the card guide installation of FIG. 2, along the lines 3—3 of FIG. 2.
Figure 4:
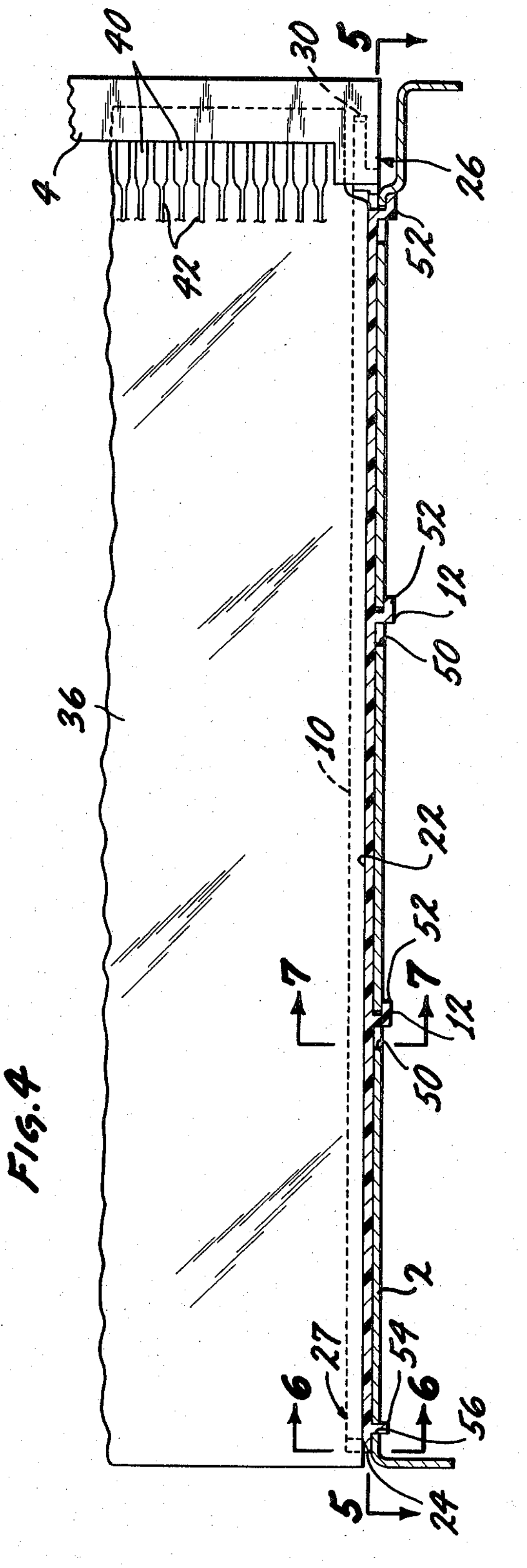
FIG. 4 is a side elevation partially in cut away of a printed circuit card guide according to this invention as mounted upon the structure of an electronic computer with a circuit card inserted into the guide.

Referring to FIG. 3, the side view of the card guide 10 shown therein illustrates the exact performance of the tangs 12 in contributing to the Applicant's improved card guide. In the insertion of the card guide 10 upon the structure 2, the ggs enter slots 50 which are longer than the horizontal or lock portion 52 of each tang 12. Once the tangs 12 have been fully inserted through the slots 50, the card guide 10 is fixed in place by shoving it forward so that the lock portions 52 pass under the structure 2 as shown in FIG. 4. When the card guide 10 has been shoved sufficiently far forward, the locking tab 54 is inserted in a tight-fitting locking hole 56, to complete the mounting of the card guide 10 by fixing the guide firmly in place. This helps prevent vibration transmission to the boards.

At this point it is worth noting that the insertion of a card guide or 10 according to this invention requires a certain amount of flexibility in the base of the card guide. Since a card guide would also preferably be made of material that is not-conductive, cheap, and easy to use in the manufacturing process, Applicant's preferred material for the practice of this invention as shown in this detailed disclosure and drawings is ordinary plastic. One important advantage of the invention is that a card guide as shown in the drawings can be made of one piece, with very little attention to tolerance.

Referring to FIG. 4, the card guide 10 shown therein fully mounted upon the structure 2 has had a printed circuit card 36 inserted so that its conducting strips 40 are in contact with the insides of the slot 34 of the connector 4, where pick-ups, not shown in the drawings, complete the electrical connection from the circuit card 36 through the connector 4 to points outside the back panel 6.

Figure 5:
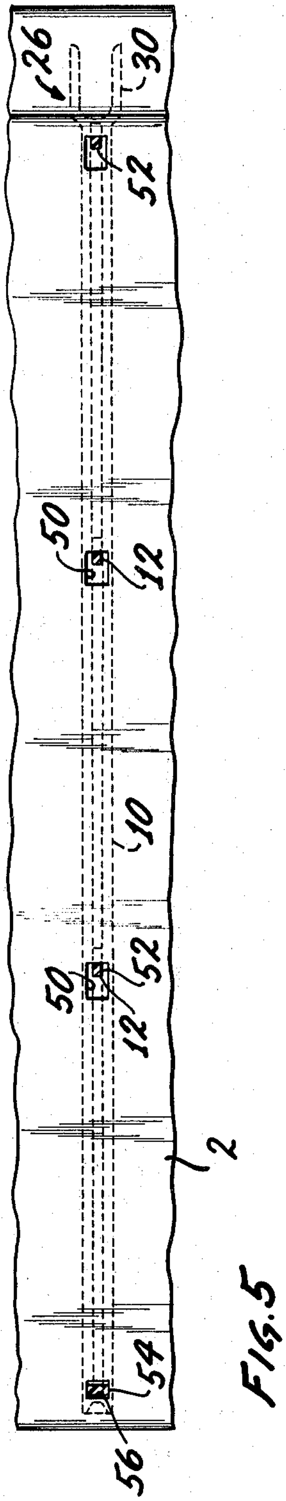
FIG. 5 is a plan elevation along the lines 5—5 of FIG. 4 of the card guide and card shown in FIG. 4.
Figure 7:
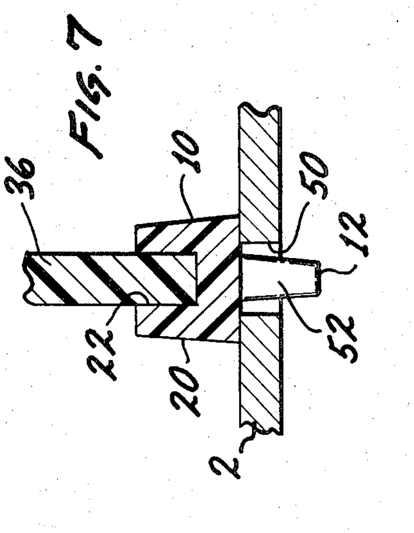
FIG. 7 is an end view along the lines 7—7 of the card guide-circuit card installation of FIG. 4.

FIG. 5 best illustrates the manner in which the lock positions 52 pass beyond the ends of the slots 50 when the locking tab 54 is inserted in the slot 56 thereby flexibly affixing a card guide 8 or 10 to the structure 2. It is also worth noting from FIG. 5 that the slots 50 according to this invention may be much larger than the tangs 12, leaving much play in a card guide in both the lengthwise and lateral directions, until such time as the locking tab 54 is placed down into its hole 56. The tangs 12 need only hold the card guide to the structure 2; the trunnion 30 and the locking tab 54 take care of the detail alignment necessities. The result is that a card guide can be very easily slipped into its proper position with perfect assurance that no alignment errors exist.

Figure 6:
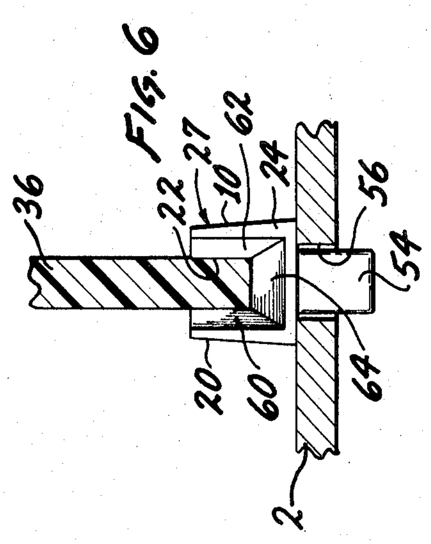
FIG. 6 is an end view of a section delineated by 6—6 of FIG. 4 of the card guide-circuit card installation of FIG. 4.

The end view of FIG. 6 shows another feature in the design of a printed circuit card guide according to this invention which is worth nothing: the widening of the card guide entrance 34 (as seen is FIG. 2) both at the sides 60 and 62 and at the bottom 64 to eliminate hunting and haphazard efforts to fit the leading edge 38 (see FIG. 2) to the slot 22 upon the original introduction of a circuit card to the card guides 8 and 10 (see FIG. 2).

In summary, Applicant has provided an improved printed circuit card guide which is more easily mounted and removed than prior art card guides, yet is peculiarly adpated for perfect card alignment vis-a-vis the connector 4 with which circuit cards must pack reliable electrical connections. This ease of mounting and removal of the card guide is matched by easier facilitation of the insertion of the circuit card 36 itself, adding up to an improved printed circuit card guide of great economy in materals, manufacturing effort, and labor-saving in the employment thereof.

Although this invention has been described in its preferred form with a certain degree of particularity, it should be noted that the protection to which the inventive concepts are entitled is not limited to the exact embodiments of these concepts set forth in the above detailed description, but rather should extend to the full scope described in the claims set forth below.

The inventive concepts for which protection is sought in this application are:

1. A printed circuit card guide system including a back panel member to which at least one connector is affixed, said system further including a card guide comprising:

A. first and second elongated base members, each said base member having a first end and a second end and first and second opposite sides;

B. a slot extending along said first side of each of said first and second base members between respective first and said second base member ends, each said slot being tapered wider at its said first end to facilitate introduction of first and second printed circuit card edges into said slots;

C. said second end of each said base member defining a trunnion configured and dimensioned to closely receive the connector;

D. a plurality of L-shaped tangs distributed along the length of said second sides of each said base member, each of said L-shaped tangs having a first arm extending outwardly and a second arm extending toward said respective second of each said base members end;

E. a locking tab disposed proximate said respective first end of each of said base members, each said locking tab extending outwardly from said second side of said respective base member and generally parallel with said first arms of said tangs distributed along the length of said second side of said respective base member;

F. support means for said first and second base members fixed in position with respect to said back panel, said support means having parallel upper and lower series of elongated slots disposed in alignment with said connector, said elongated slots of each series being dimensioned and distributed to loosely receive said tangs of one of said base members, said support means further having first and second locking apertures, each of said locking apertures being positioned and dimensioned to tightly receive one of said locking tabs;

whereby said base members may be rigidly and accurately affixed to said support means, in parallel disposition to one another with said slots facing each other, by engaging said trunnions with said connector and said tangs of said first and second base member respectively with said first and second series of elongated slots and subsequently engaging each of said locking tabs with the corresponding one of said locking apertures, said first and second base member thus comprising a card guide for receiving two edges of a printed circuit card.

2. The system of claim 1 which comprises a plurality of laterally spaced card guides carried by said support means to accommodate a corresponding plurality of printed circuit cards.

* * * * *